United States Patent

Chapman et al.

[11] Patent Number: 5,876,821
[45] Date of Patent: *Mar. 2, 1999

[54] TETRA DYE MIXED WITH ANOTHER DYE OR DYES FOR OPTICAL RECORDING ELEMENTS

[75] Inventors: Derek David Chapman, Rochester; James C Fleming; Ramanuj Goswami, both of Webster; Csaba Andras Kovacs, Rochester, all of N.Y.

[73] Assignee: Eastman Kodak Company, Rochester, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 731,476

[22] Filed: Oct. 16, 1996

[51] Int. Cl.$^6$ .................................................. B32B 3/00
[52] U.S. Cl. .................. 428/64.1; 428/64.2; 428/64.4; 428/64.8; 428/913; 430/270.14; 430/495.1; 430/945; 369/283; 369/288
[58] Field of Search ................................. 428/64.1, 64.2, 428/64.4, 64.8, 913; 430/270.14, 270.15, 495.1, 945; 369/283, 288

[56] References Cited

U.S. PATENT DOCUMENTS

| | | | |
|---|---|---|---|
| 5,294,471 | 3/1994 | Evans et al. | 428/64.1 |
| 5,426,015 | 6/1995 | Chapman et al. | 428/64.1 |
| 5,500,325 | 3/1996 | Chapman et al. | 428/64.1 |

FOREIGN PATENT DOCUMENTS 0 483 387    5/1992    European Pat. Off. .

*Primary Examiner*—Elizabeth Evans
*Attorney, Agent, or Firm*—John R. Everett

[57] ABSTRACT

A dye mixture having, at 780 nm, a real refractive index not less than 1.8, and an imaginary part not greater than 0.15 and comprising (a) a tetra dye having a metallized azo dianionic dye with a cationic dye counterion and (b) at least one other dye having the structure according to formula I:

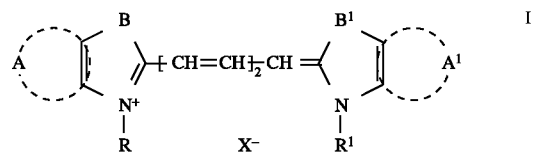

wherein:

A may be equal to or different from $A^1$, in which each represents an aryl group having 6 to 10 carbon atoms;

B may be equal to or different from $B^1$, in which each

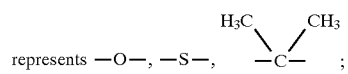

R and $R^1$ represent an alkyl group of $C_1$–$C_{10}$ or an aryl group having 6 to 10 carbon atoms; and X represents halide, $ClO_4$, $BF_4$, $PF_6$, tosylate and RCOO.

13 Claims, 1 Drawing Sheet

TETRA DYE MIXED WITH ANOTHER DYE OR DYES FOR OPTICAL RECORDING ELEMENTS

FIELD OF THE INVENTION

The present invention relates to optical recording elements, including recordable optical elements.

BACKGROUND OF THE INVENTION

There are many types of known optical recording elements. In many of the elements, the mode of operation requires a recording layer having a high absorption and the recorded marks, often referred to as pits, have low optical density or high reflectivity. The high reflectivity pits are made by ablating away the high absorption recording material, usually exposing an underlying reflective layer.

One of the currently popular forms of optical storage of information is the compact disk or CD. Digital information is stored in the form of high optical density marks or pits on an otherwise reflective background, as read with a focused laser diode operating in the 780–835 nm spectral region. This is the exact opposite of the above described optical recording materials. In this format, the optical information is most often in the form of read only memory or ROM. Optical information is not usually recorded in real time but rather is produced by press molding. In a typical process, the optical recording substrate is first press molded with a master containing the digital information to be reproduced. The thus formed information is then overcoated with a reflective layer and then with an optional protective layer. In those areas having the deformations or pits, the optical density is higher than in those areas not having the deformations.

It is desirable to produce optical recording elements which, when recorded in real time, produce a record that mimics the conventional CD on read out by generating dark marks on a reflective background.

One recently disclosed system of this type is the so called "Photo CD". In this system, conventional photographic film is first processed in a conventional manner. Then, the images from the film are scanned and digitized. The digitized information is recorded in a CD readable form on an optical recording element. Images can then be played back on a CD type player into a conventional television.

Commercially useful materials of the type described in these references have stringent requirements. The recording layer must be able to couple with incident write laser irradiation to provide features having sufficient contrast. At the same time the unmarked portion of the disk must have sufficient reflectivity to conform to the 70% CD-ROM standard (ISO/IEC 10149). The layer must also have good stability towards light, heat and humidity for acceptable shelf life. Photo CD, for example, is a consumer product and it must be capable of withstanding extreme environments. Between the time the original images are recorded on the Photo CD and the time subsequent images are recorded, the CD might be placed in strong sunlight.

Thus, there is a continuing need for optical recording materials that have the necessary optical characteristics so that they are CD compatible, can couple with incident laser irradiation to form features with sufficient contrast, meet the minimum reflectivity standard, and yet are light stable. It is to a solution to this problem that the present invention is directed.

U.S. Pat. No. 5,426,015 discloses optical recording elements having recording layers containing tetra dyes. These dyes comprise metallized azodianions with cationic dye counterions. These elements exhibit sensitivity that could be improved.

BRIEF DESCRIPTION OF THE FIGURES

Both

SUMMARY OF THE INVENTION

Figure 1:
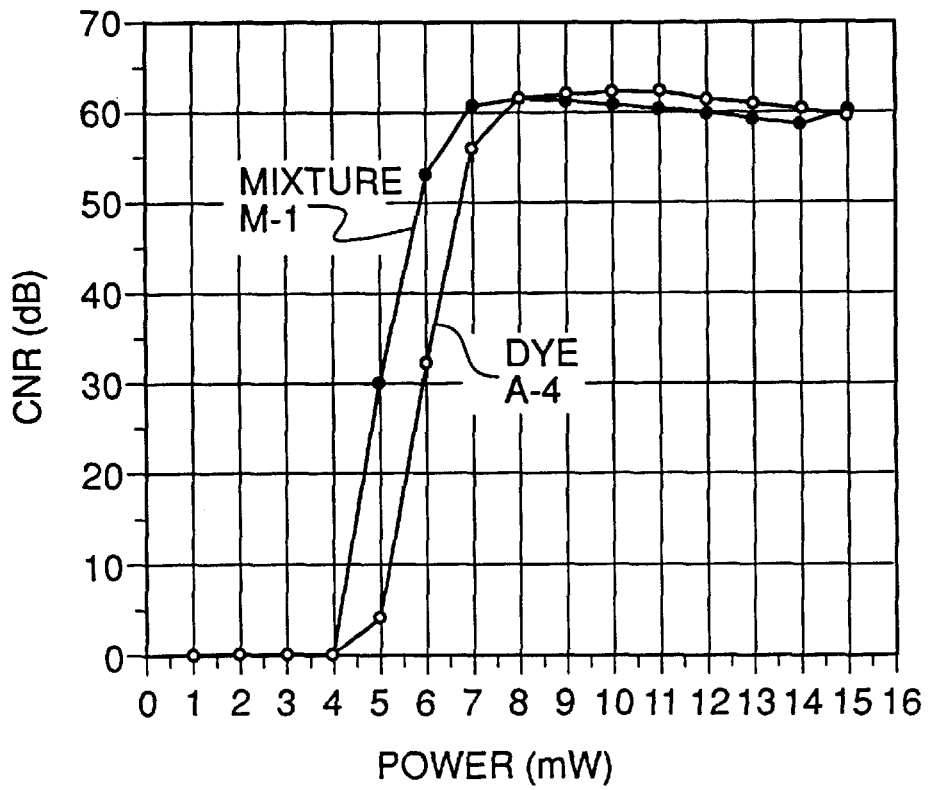
FIGS. 1 and 2 illustrate the improved sensitivity of the elements of the invention compared to the closest prior elements.

The present invention a dye mixture having, at 780 nm, a real refractive index not less than 1.8, and an imaginary part not greater than 0.15 and comprising (a) a tetra dye having a metallized azo dianionic dye with a cationic dye counterion and (b) at least one other dye having the structure according to formula I:

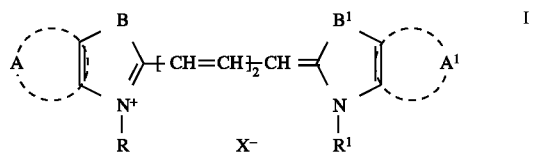

wherein:

A may be equal to or different from $A^1$, in which each represents an aryl group having 6 to 10 carbon atoms;

B may be equal to or different from $B^1$, in which each

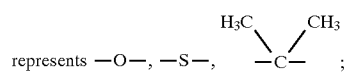

R and $R^1$ represent an alkyl group of $C_{1-C10}$ or an aryl group having 6 to 10 carbon atoms; and X represents halide, $ClO_4$, $BF_4$, $PF_6$, tosylate and RCOO.

For convenience the tetra dyes having a metallized azo dianionic dye component in combination with a cationic dye counterion may be referred to herein as tetra dyes.

The present invention also provides optical recording elements having recording layers made with the mixtures of the invention. The elements possess greater sensitivity compared to prior art elements of U.S. Pat. No. 5,426,015.

DETAILS OF THE INVENTION

Examples of representative added dyes of structure (I):

TABLE 1
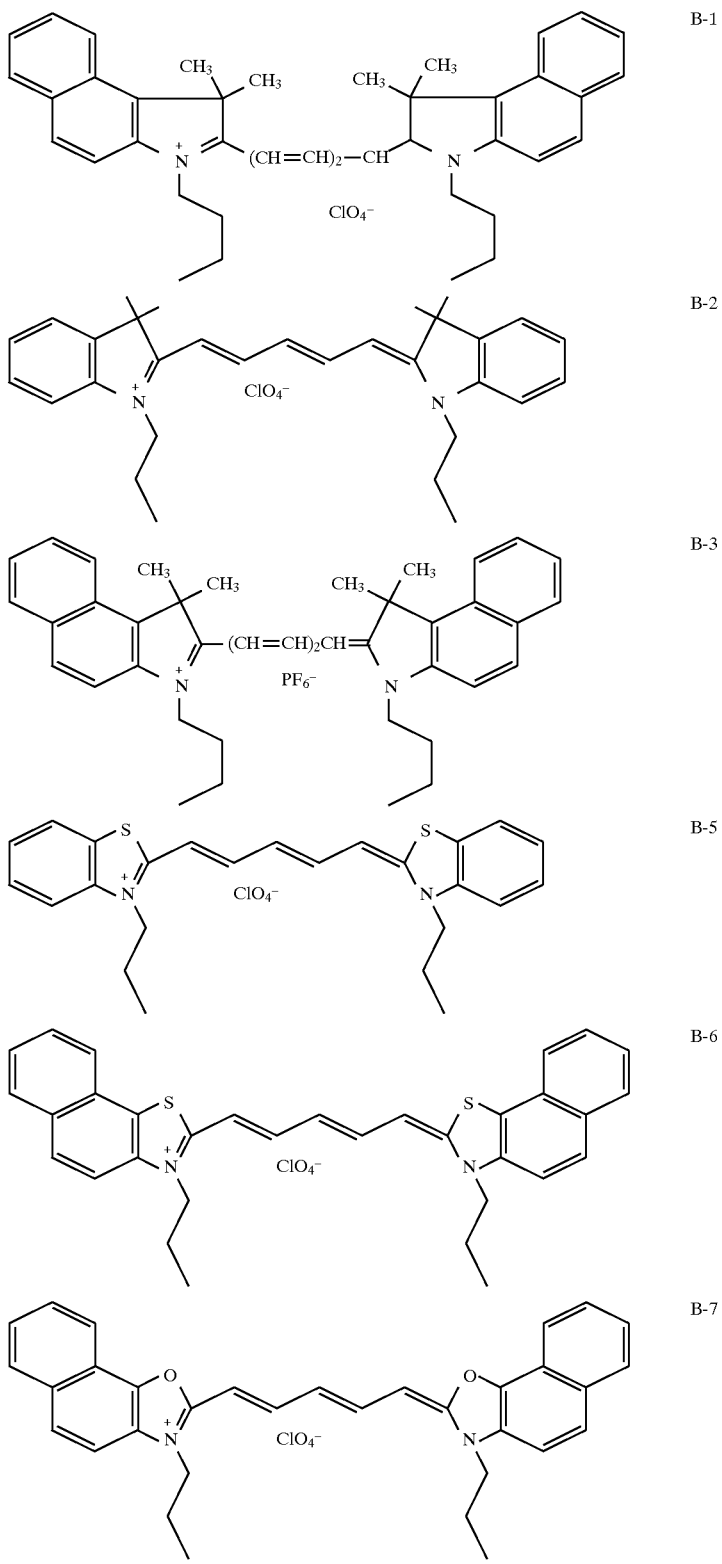

TABLE 1-continued

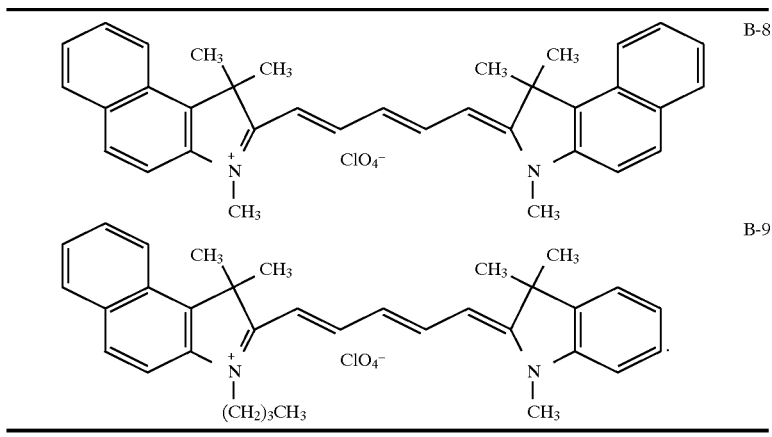

Examples of representative tetra dyes have the structure (II):

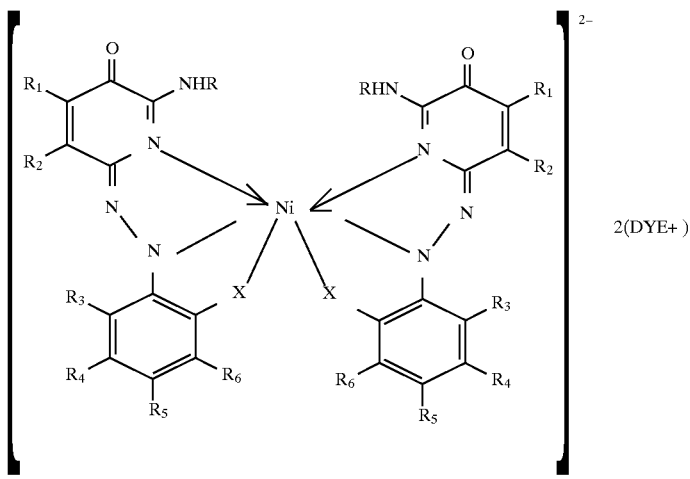

wherein

R represents hydrogen, alkyl having 1 to 20 carbons, aryl having 6 to 10 carbon atoms;

$R_1$ represents hydrogen or alkyl having 1 to 6 carbon atoms;

$R_2$ represents a hydrogen, alkyl having 1 to 5 carbon atoms, $SO_2R_7$ or $SO_2NHR_7$ where $R_7$ is alkyl having 1 to 10 carbon atoms, aryl having 6 to 10 carbon atoms, hetaryl having 5 to 10 carbon atoms or halogen;

$R_3$ represents hydrogen, alkyl having 1 to 4 carbon atoms or halogen.

$R_4$ represents hydrogen, halogen, alkyl having 1 to 10 carbons, $SO_2R_7$ or $SO_2NHR_7$;

$R_5$ represents an electron withdrawing group such as CN, $SO_2R_8$, $SO_2NR_9R_{10}$ where $R_8$, $R_9$ or $R_{10}$ each independently represents hydrogen, alkyl group from 1 to 5 carbons; aryl having 6 to 10 carbon atoms; hetaryl, having 5 to 10 carbons, cycloalkyl having 5 to 7 carbons;

$R_6$ represents hydrogen; alkyl having 1 to 5 carbons or halogen;

X represents oxygen, carboxyl or sulfo; and

Dye+ represent a cationic dye chromophore.

In preferred embodiments, the Dye+ is a cyanine dye having the general structure:

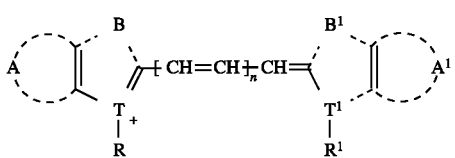

wherein:

T may be equal to or different from $T^1$, in which each represents N, O, or S, respectively;

A may be equal to or different from $A^1$, in which each represents an aromatic ring;

B may be equal to or different from $B^1$, in which each

represents —O—, —S—,

—Se—, —CH=CH—, or where E represents an unsubstituted or substituted alkyl group of $C_1$–$C_{10}$ or unsubstituted or substituted aromatic ring; or B may be combined with A to form an aromatic ring;

R and $R^1$ exist when T is N, R is equal to or different from $R^1$ and represents an unsubstituted or substituted alkyl group of $C_1$–$C_{10}$ or an unsubstituted or substituted aromatic ring; and n represents an integer from 1 to 2.

Representative tetra dyes can be formed from dianionic dye structures selected from Table 2 in combination with a cationic dye counterion selected from Table 3:

TABLE 2

Dianionic Dye Structure

[structure diagram]

| Dianion Ni Complex | R | R1 | R2 | R3 | R4 | R5 | R6 | X |
|---|---|---|---|---|---|---|---|---|
| A | H | H | H | H | Cl | $CH_3SO_2$ | H | O |
| B | H | H | Br | H | H | $CH_3SO_2$ | H | O |

TABLE 2-continued

Dianionic Dye Structure

[structure diagram]

| Dianion Ni Complex | R | R1 | R2 | R3 | R4 | R5 | R6 | X |
|---|---|---|---|---|---|---|---|---|
| C | H | H | $CH_3SO_2$ | H | Cl | $CH_3SO_2$ | H | O |
| D | H | H | $CH_3SO_2$ | H | Cl | $(CH_3)_3CNHSO_2$ | H | O |
| E | H | $CH_3$ | $CH_3SO_2$ | H | Cl | $CH_3SO_2$ | H | O |
| F | H | $CH_3$ | $CH_3SO_2$ | H | H | $NO_2$ | H | $SO_3$ |
| G | H | H | $CH_3SO_2$ | H | H | $CH_3SO_2$ | H | O |
| H | H | H | H | H | H | $CH_3SO_2$ | H | O |

TABLE 3

| No. | Cationic Structures |
|---|---|
| 1 | [structure diagram with indole groups, $(CH=CH)_2CH$ linker, and thiophene-methyl N-substituents] |
| 2 | [structure diagram with indole groups, $(CH=CH)_2$–CH linker, and propyl N-substituents] |

TABLE 3-continued

| No. | Cationic Structures |
|---|---|
| 3 | |
| 4 | |
| 5 | |
| 6 | |
| 9 | |
| 10 | |
| 11 | |

TABLE 3-continued

| No. | Cationic Structures |
|---|---|
| 12 | (structure) |
| 13 | (structure) |
| 14 | (structure) |
| 15 | (structure) |

Useful tetra dyes, formed from the components of Tables 2 and 3 are presented in Table 4:

TABLE 4

[Anionic Ni Azo Structure]$^{2-}$ 2[Cationic Structure]$^+$

| Tetra Dyes | Anionic Ni Azo Structures | Cationic Structure |
|---|---|---|
| A1 | C | 1 |
| A2 | H | 2 |
| A3 | C | 2 |
| A4 | D | 5 |
| A5 | C | 3 |
| A10 | C | 4 |
| A11 | C | 13 |
| A12 | C | 14 |
| A13 | D | 2 |
| A15 | E | 10 |
| A16 | E | 12 |
| A17 | F | 2 |

Examples of representative dye mixtures of the invention are formed from the tetra dyes of table 4 and the addenda dyes of table 1. Table 5 discloses such dye mixtures:

TABLE 5

Dye Mixtures

| Mixture No. | Tetra Dye No. from Table 4 | First Added Dye No. from Table 1 | Second Added Dye No. from Table 1 |
|---|---|---|---|
| M-1 | A-4 | B-1 | |
| M-2 | A-3 | B-1 | |
| M-3 | A-3 | B-3 | |
| M-4 | A-2 | B-1 | |
| M-5 | A-13 | B-1 | |
| M-6 | A-17 | B-1 | |
| M-7a | A-13 | B-1 | B-2 |
| M-8 | A-13 | B-1 | B-9 |
| M-10 | A-3 | B-1 | B-9 |
| M-11 | A-13 | B-1 | A-3 |

Optical Recording Elements

The optical elements of the invention comprise a light transmitting, typically pregrooved substrate, a light absorptive layer comprising a dye of the invention overlaying the substrate, a light reflective layer overlaying the light absorptive layer and a protective layer overlaying the light reflective layer. The recording process will produce marks of lower reflectivity than the unmarked areas of the disk when written and read with a diode laser emitting between 770 and 800 nm. The different dyes in the mixture are selected so that the real part of the complex refractive index (n) of the unwritten recording layer measured with a 780 nm light source is not less than 1.8 and the imaginary part (k) is not greater than 0.15.

The substrate may be any transparent material that satisfies the mechanical and optical requirements. The substrates are generally pregrooved with groove depths from 20 to 250 nm, groove widths 0.2 to 1 μm and a pitch 0.5 to 2 μm. The preferred material is polycarbonate, other materials are glass, polymethylmethacrylate and other suitable polymeric materials.

The preparation of the optical recording element of the invention is achieved by spin coating the dye mixture, or with other addenda from a suitable solvent onto a transparent substrate. For coating, the dye mixture with or without addenda is dissolved in a suitable solvent so that the dye is 20 or less parts by weight to 100 parts of solvent by volume. The dye recording layer of the element is then overcoated with a metal reflective layer under reduced pressure by resistive heating or a sputter method and finally over-coated with a protective resin.

Coating solvents for the dye recording layer are selected to minimize their effect on the substrate. Useful solvents include as alcohols, ethers, hydrocarbons, hydrocarbon halogens, cellosolves, ketones. Examples of solvents are methanol, ethanol, propanol, pentanol, 2,2,3,3-tetrafluoropropanol, tetrachloroethane, dichloromethane, methyl cellosolve, ethyl cellosolve, 1-methoxy-2-propanol, methyl ethyl ketone, 4-hydroxy-4-methyl-2-pentanone. Preferred solvents are alcohols since they have the least effect on the preferred polycarbonate substrates. Mixtures of solvents can also be used.

Useful addenda for the recording layer include stabilizers, surfactants, binders and diluents.

The reflective layer can be any of the metals conventionally used for optical recording materials. Useful metals can be vacuum evaporated or sputtered and include gold, silver, aluminum and copper and alloys thereof.

The protective layer over the reflective layer is similarly conventional for this art. Useful materials include UV curable acrylates.

One preferred protective layer is disclosed in U.S. Pat. No. 5,312,663 in the names of Kosinski and Amell. This patent discloses a two layer structure in which the layer adjacent to the reflective layer is spin coated and the a second layer is screen printed.

An intermediate layer, to protect the metal layer from oxidation, can also be present.

The element of the invention can have prerecorded ROM areas as described in U.S. Pat. No. 4,940,618. The surface of the substrate can have a separate heat deformable layer as described in U.S. Pat. No. 4,990,388. Other patents relating to recordable CD type elements are U.S. Pat. Nos. 5,009,818; 5,080,946; 5,090,009; 4,577,291; 5,075,147; and 5,079,135.

EXAMPLES

The following examples demonstrate the optical recording capability of the recording layer mixtures used in the elements of this invention. The composition of the dye mixture, the groove depth and groove width dimensions on the substrate and the optical density of the dye coatings are given in Table 6.

Example 1 with Dye Mixture M1

A polycarbonate disc substrate having a thickness of 1.2 mm, an outer diameter of 120 mm and an inner diameter of 15 mm and having a spiral pregroove formed on its surface with a width of 350 nm, and a depth of 212 nm and a pitch of 1.6 $\mu$m, was made by injection molding.

To form the optical recording layer 1 part by weight of mixture M-1 shown in table 5 hereafter was dissolved in 40 parts of a mixture of 1-methoxy-2-propanol and diacetone alcohol in 97 to 3 ratio by volume with stirring at room temperature for 1 hour. The solution was filtered through a 0.2 $\mu$m filter. Then the solution was coated on the surface of the substrate by spin coating with a Headway Research Coater (Model No. CB 15/PWM 101) to an optical density of 1.36 at 671 nm. It was dried at 80° C. for 15 minutes and at 60° C. for 6 hours.

Then a gold reflective layer was deposited on the dye side over the entire surface of the disc by a DC magnetron sputtering process to about 60 nm thickness.

A protective lacquer layer (Daicure SD-17) was applied by spin coating onto the gold layer to a thickness of 7 to 11 $\mu$m and it was UV cured with an 'H' bulb using a fusion system cure at 1181 W/cm (3000 W/inch) power for 15 seconds.

The optical element was tested in the following manner. A test system consisting of an optical head with a 788 nm laser, a 0.5 NA lens, phase tracking, and ½ aperture focusing was used. The optics used circularly polarized light to reduce laser feed-back effects. Recording and play back were carried out with the same laser at 2.8 m/s rotational speed. The read power was kept at 0.6 mW. A single frequency was recorded with about 3.5 micron mark and land length at 9 mW write power, through a 30 Kz filter, forming marks of lower reflectivity than the unmarked area when examine with a light source emitting at 788 nm light. When the marks were read the CNR (Alan B. Marchant, *Optical Recording*; Addison-Wesley Publishing Company, 1990, pg. 397) was 62 dB. When compared to tetra dye A-4 by itself, improved sensitivity was demonstrated as seen in FIG. 1 and comparative example 1 hereafter.

Examples 2 to 14

For examples 2 to 14 the same solution composition, dye mixture to solvent ratio, filter, spin coater, drying conditions, gold deposition process, lacquer layer application and testing procedure was used as in the first example. The composition of the dye mixture, the groove depth and groove width dimensions on the substrate and the optical density of the dye coatings are given in Table 6. The CNR data of 56 dB or over indicate that high optical contrast was attained in every example.

TABLE 6

| | | Dye Mixtures | | | | | | | |
|---|---|---|---|---|---|---|---|---|---|
| Example | Mixture No. | Tetra Dye No. | First Added Dye No. | Second Added Dye No. | Ratio Dyes | Index N/k at 780 nm | Substrate Groove Depth nm Width nm | Optical Density 671 nm | CNR 9 mW |
| 1 | M-1 | A-4 | B-1 | | 4/1 | 2.5/0.062 | 82/560 | 1.36 | 62 |
| 2 | M-2a | A-3 | B-1 | | 4/1 | 2.6/0.071 | 82/560 | 1.30 | 60 |

TABLE 6-continued

| | | | Dye Mixtures | | | | | | |
| Example | Mixture No. | Tetra Dye No. | First Added Dye No. | Second Added Dye No. | Ratio Dyes | Index N/k at 780 nm | Substrate Groove Depth nm Width nm | Optical Density 671 nm | CNR 9 mW |
|---|---|---|---|---|---|---|---|---|---|
| 3 | M-2b | A-3 | B-1 | | 4/1 | 2.6/0.071 | 212/350 | 0.91 | 58 |
| 4 | M-3 | A-3 | B-3 | | 4/1 | | 212/350 | 0.60 | 56 |
| 5 | M-4 | A-2 | B-1 | | 4/1 | | 82/560 | 1.29 | 60 |
| 6 | M-5a | A-13 | B-1 | | 4/1 | 2.5/0.060 | 82/560 | 1.22 | 61 |
| 7 | M-5b | A-13 | B-1 | | 4/1 | 2.5/0.060 | 212/350 | 0.88 | 59 |
| 8 | M-6 | A-17 | B-1 | | 4/1 | | 212/350 | 0.93 | 56 |
| 9 | M-7a | A-13 | B-1 | B-2 | 7/2/1 | 2.5/0.058 | 194/600 | 0.97 | 59 |
| 10 | M-7b | A-13 | B-1 | B-2 | 7/2/1 | 2.5/0.058 | 212/350 | 0.78 | 57 |
| 11 | M-8 | A-13 | B-1 | B-9 | 7/2/1 | 2.5/0.064 | 212/350 | 0.73 | 57 |
| 13 | M-10 | A-3 | B-1 | B-9 | 7/2/1 | | 212/350 | 0.57 | 56 |
| 14 | M-11 | A-13 | B-1 | A-3 | 2/1/2 | 2.6/0.070 | 212/350 | 0.70 | 56 |

Comparative Example 1

The same coating procedure and test procedures were used for both the single dye A-4 and the dye mixture M-1 on 82 nm deep and 560 nm wide grooved substrate as was described in example 1 above. The optical density for the single dye A-4 at 671 nm was 1.18 and for the dye mixture M-1 it was 1.21. When the two coatings were tested by writing a power series, a 1 mW sensitivity difference in favor of the dye mixture was observed at the lower powers. (FIG. 1)

Comparative Example 2

Figure 2:
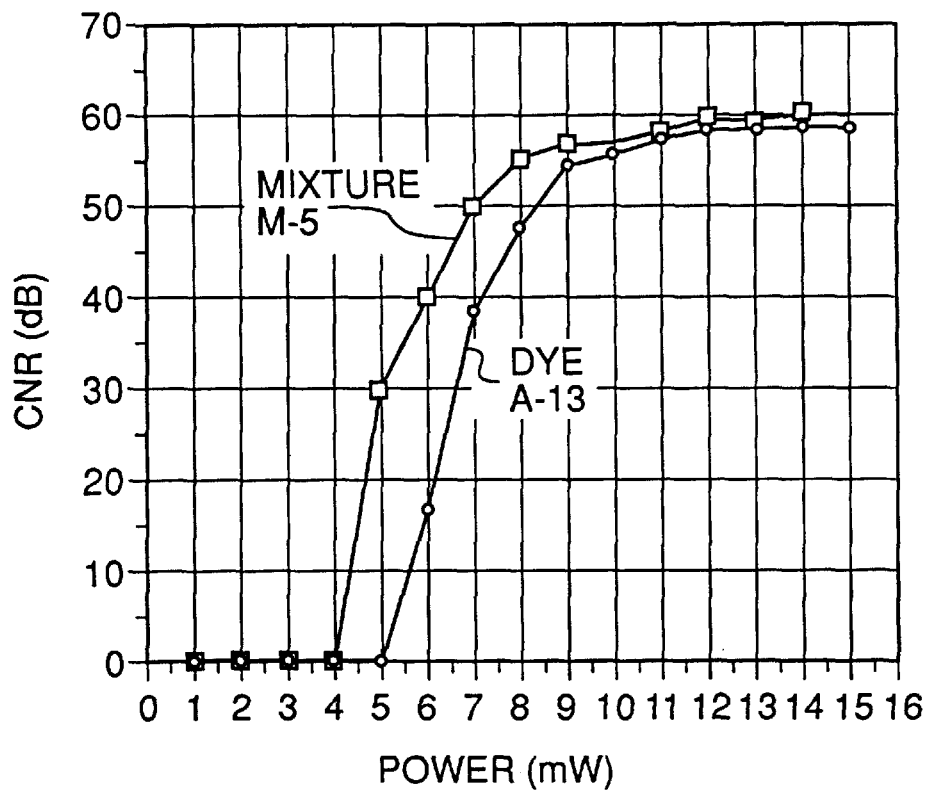

The same coating procedure and test procedures were used for both single dye A-13 and dye mixture M-5B on 212 nm deep and 350 nm wide grooved substrate as was used in Example 1 above. The optical density for the single dye A-13 at 671 nm was 0.68 and for the dye mixture M-5B it was 0.64. When the two coatings were tested by writing a power series, a 1 mW sensitivity difference in favor of the dye mixture was observed at the lower powers (FIG. 2).

Light Stability

The dye mixtures were spin coated on 2 by 2 inch polycarbonate slides. Optical density measurements were taken on the slides with a Hewlett Packard 8450A Diode Array Spectrophotometer between 400 nm and 800 nm wave lengths. The slide was exposed through the polycarbonate for sixteen days by a method recommended by the Image Stability Technical Center for standard 50 Klux Daylight exposure(ANSI IT 9.9–1990 "Stability of Color Photographic Images", Section 5 Paragraph 5.6, describes Simulated Indoor Indirect Daylight exposure). After sixteen days the optical densities were remeasured. Dye loss was approximated by determining the percent loss in optical density at λ-max. The results are presented in Table 7.

TABLE 7

Light Stability

| Mixture | % Optical Density Loss After 16 days 50 Klux light Exposure |
|---|---|
| M-5B | 12.1 |
| M-6, | 18.9 |
| Reference Tetra A-13 | 8.6 |
| Reference Tetra A-17 | 15.0 |
| Reference Addenda Dye B-1 | 100 |

This table shows that the dye mixtures of the invention have greatly improved light stability compared to the addenda dye alone.

The invention has been described in detail with particular reference to a preferred embodiment thereof. However it will be understood that variations and modifications can be effected within the spirit and scope of the invention as described hereinabove and defined in the appended claims.

We claim:

1. A dye mixture having, at 780 nm, a real refractive index not less than 1.8, and an imaginary part not greater than 0.15 and comprising (a) a tetra dye having a metallized azo dianionic dye with cationic dye counterions and (b) at least one other dye having the structure according to formula I:

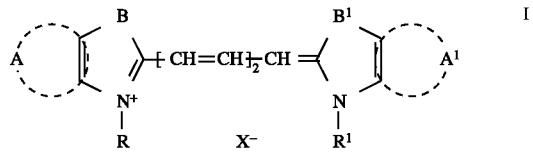

wherein:

A may be equal to or different from $A^1$, in which each represents an aryl group having 6 to 10 carbon atoms;

B may be equal to or different from $B^1$, in which each represents 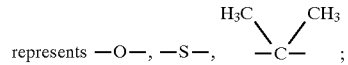

R and $R^1$ represent an alkyl group of $C_1$–$C_{10}$ or an aryl group having 6 to 10 carbon atoms; and X represents halide, $ClO_4$, $BF_4$, $PF6$, tosylate and RCOO.

2. A dye mixture according to claim 1, wherein the dye having a structure according to formula I is selected from the group consisting of:

TABLE 1
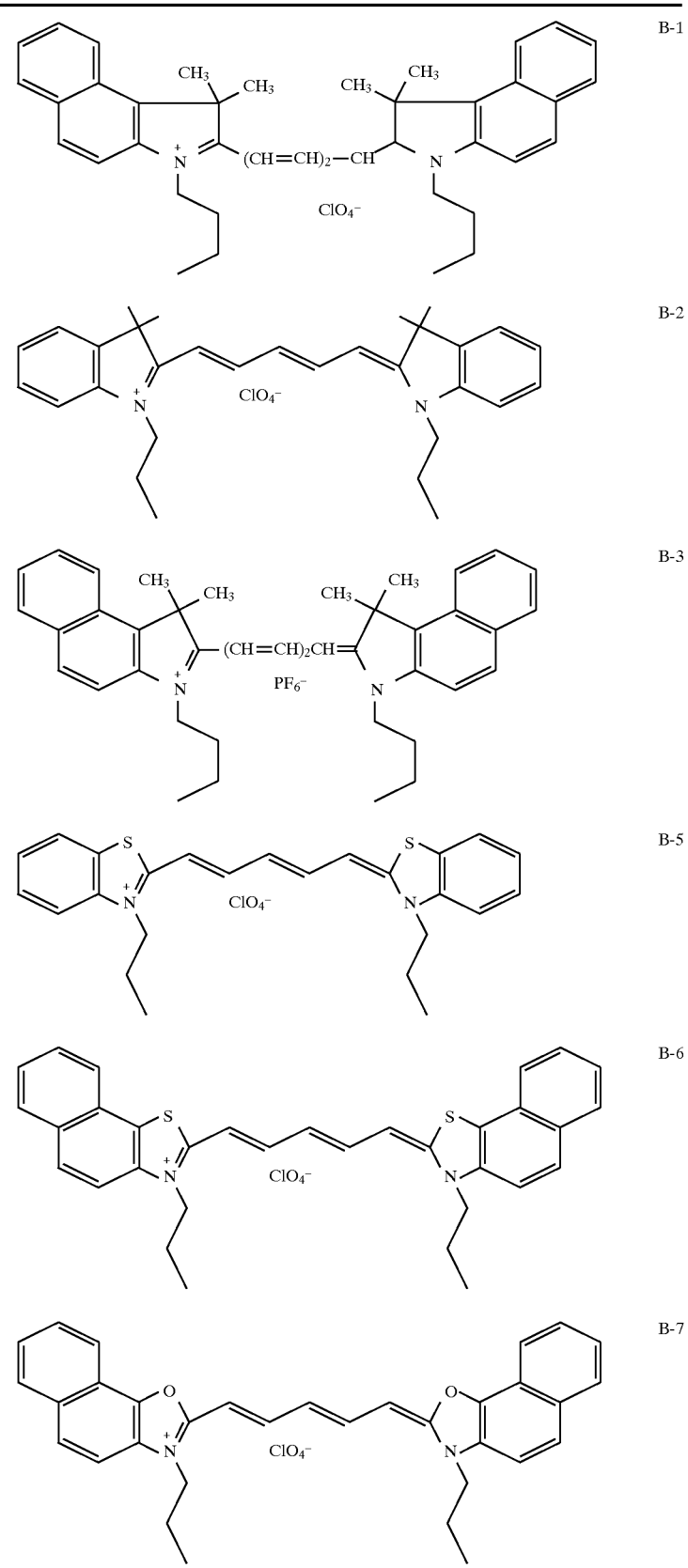

TABLE 1-continued

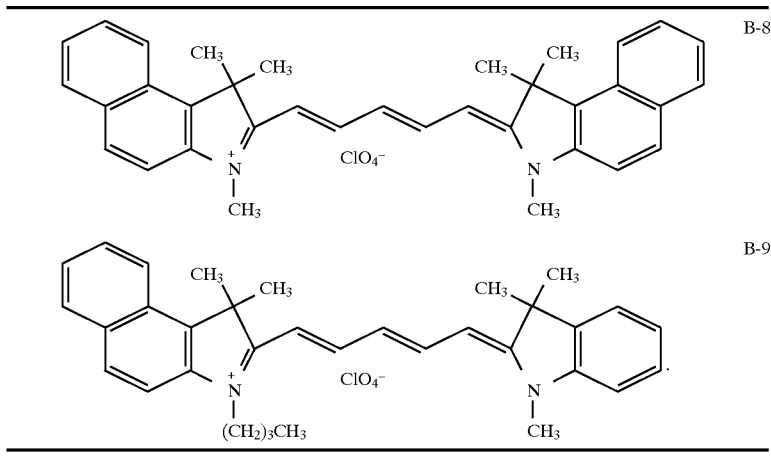

3. The mixture of claim 1 wherein the tetra dye has the structure (II):

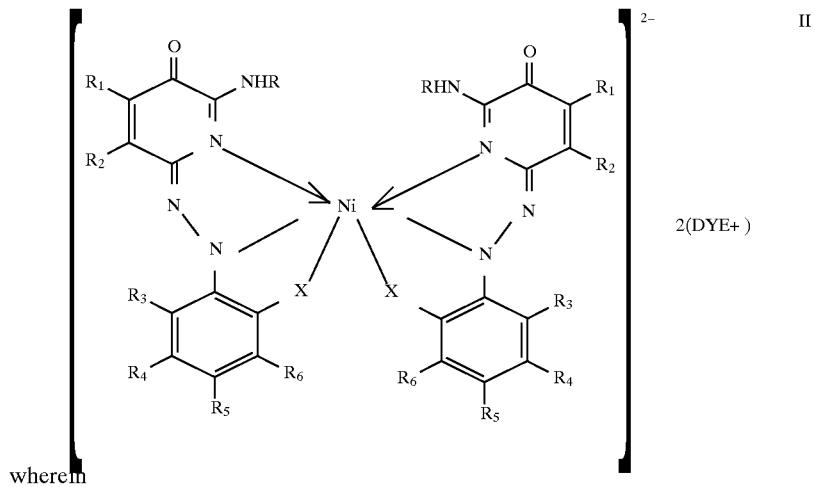

wherein

R represents hydrogen, alkyl having 1 to 20 carbons, aryl having 6 to 10 carbon atoms;

$R_1$ represents hydrogen or alkyl having 1 to 6 carbon atoms;

$R_2$ represents a hydrogen, alkyl having 1 to 5 carbon atoms, $SO_2R_7$ or $SO_2NHR_7$ where $R_7$ is alkyl having 1 to 10 carbon atoms, aryl having 6 to 10 carbon atoms, hetaryl having 5 to 10 carbon atoms or halogen;

$R_3$ represents hydrogen, alkyl having 1 to 4 carbon atoms or halogens;

$R_4$ represents hydrogen, halogen, alkyl having 1 to 10 carbons, $SO_2R_7$ or $SO_2NHR_7$;

$R_5$ represents an electron withdrawing group such as CN, $SO_2R_8$, $SO2NR_9R_{10}$ where $R_8$, $R_9$ or $R_{10}$ each independently represents hydrogen, alkyl group from 1 to 5 carbons; aryl having 6 to 10 carbon atoms; hetaryl, having 5 to 10 carbons, cycloalkyl having 5 to 7 carbons;

$R_6$ represents hydrogen; alkyl having 1 to 5 carbons or halogen;

X represents oxygen, carboxyl or sulfo; and

Dye+ represent a cationic dye chromophore.

4. The mixture of claim 3 wherein the metallized azo dianionic dye has a structure according to the following Table 2 and the cationic dye counterion has a structure selected from Table 3:

TABLE 2

Dianionic Dye Structure

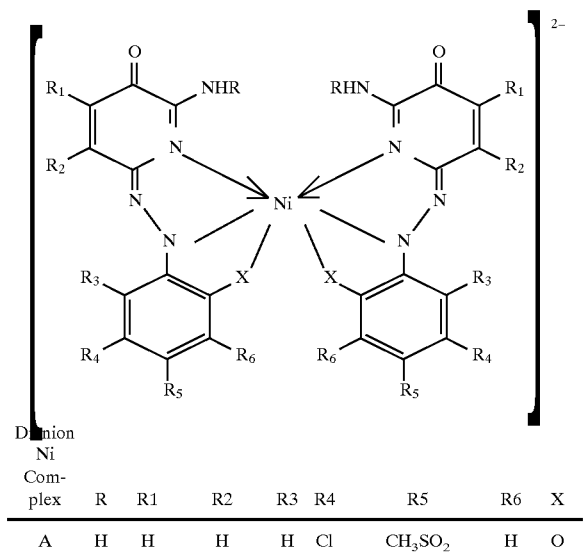

| Dianion Ni Complex | R | R1 | R2 | R3 | R4 | R5 | R6 | X |
|---|---|---|---|---|---|---|---|---|
| A | H | H | H | H | Cl | $CH_3SO_2$ | H | O |

TABLE 2-continued
Dianionic Dye Structure
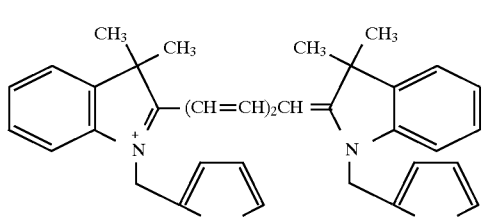
| Dianion Ni Complex | R | R1 | R2 | R3 | R4 | R5 | R6 | X |
|---|---|---|---|---|---|---|---|---|
| B | H | H | Br | H | H | $CH_3SO_2$ | H | O |
| C | H | H | $CH_3SO_2$ | H | Cl | $CH_3SO_2$ | H | O |
| D | H | H | $CH_3SO_2$ | H | Cl | $(CH_3)_3CNHSO_2$ | H | O |
| E | H | $CH_3$ | $CH_3SO_2$ | H | Cl | $CH_3SO_2$ | H | O |
| F | H | $CH_3$ | $CH_3SO_2$ | H | H | $NO_2$ | H | $SO_3$ |
| G | H | H | $CH_3SO_2$ | H | H | $CH_3SO_2$ | H | O |
| H | H | H | H | H | H | $CH_3SO_2$ | H | O |
TABLE 3
| No. | Cationic Structures |
|---|---|
| 1 | 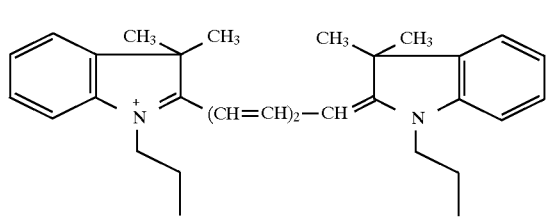 |
| 2 | |
| 3 | 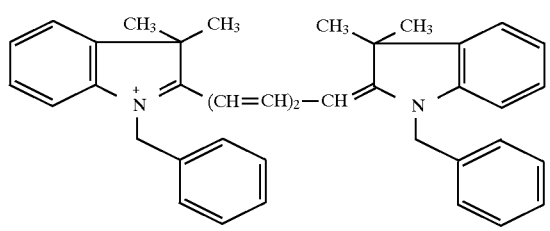 |

TABLE 3-continued

| No. | Cationic Structures |
|---|---|
| 4 | |
| 5 | |
| 6 | |
| 9 | |
| 10 | |
| 11 | |
| 12 | |

TABLE 3-continued

| No. | Cationic Structures |
|---|---|
| 13 |  |
| 14 | |
| 15 | |

5. The mixture of claim 4 wherein the tetra dye has a structure according to Table 4:

TABLE 4

Tetra Dyes

| Tetra Dye Number | [Dianionic Ni Azo Structures]$^2$ from Table 2 | [Cationic Structure]$^+$ from Table 3 |
|---|---|---|
| A1 | C | 1 |
| A2 | H | 2 |
| A3 | C | 2 |
| A4 | D | 5 |
| A5 | C | 3 |
| A10 | C | 4 |
| A11 | C | 13 |
| A12 | C | 14 |
| A13 | D | 2 |
| A15 | E | 10 |
| A16 | E | 12 |
| A17 | F | 2 |

6. A mixture according to claim 5 selected from table 5:

TABLE 5

Dye Mixtures

| Mixture No. | Tetra Dye No. from Table 4 | First Added Dye No. from Table 1 | Second Added Dye No. from Table 1 |
|---|---|---|---|
| M-1 | A-4 | B-1 | |
| M-2 | A-3 | B-1 | |
| M-3 | A-3 | B-3 | |
| M-4 | A-2 | B-1 | |
| M-5 | A-13 | B-1 | |
| M-6 | A-17 | B-1 | |
| M-7a | A-13 | B-1 | B-2 |
| M-8 | A-13 | B-1 | B-9 |
| M-10 | A-3 | B-1 | B-9 |
| M-11 | A-13 | B-1 | A-3 |

7. An optical recording element having a transparent substrate and on the surface of said substrate, a recording layer and a light reflecting layer wherein the unrecorded layer recording layer is a layer of a mixture according to claim 1.

8. An optical recording element having a transparent substrate and on the surface of said substrate, a recording layer and a light reflecting layer wherein the unrecorded layer recording layer comprises a dye mixture having, at 780 nm, a real refractive index not less than 1.8, and an imaginary part not greater than 0.15 and comprising (a) a tetra dye having a metallized azo dianionic dye with cationic dye counterions and (b) at least one other dye having the structure according to formula I:

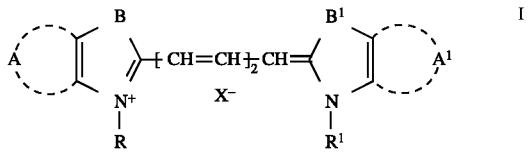

wherein:

A may be equal to or different from $A^1$, in which each represents an aryl group having 6 to 10 carbon atoms;

B may be equal to or different from $B^1$, in which each represents —O—, —S—,

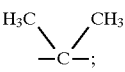

R and $R^1$ represent an alkyl group of $C_1$–$C_{10}$ or an aryl group having 6 to 10 carbon atoms; and X represents halide, $ClO_4$, $BF_4$, $PF_6$, tosylate and RCOO.

9. The optical recording element of claim 8 wherein the dye has a structure according to formula I is selected from the group consisting of:

TABLE 1
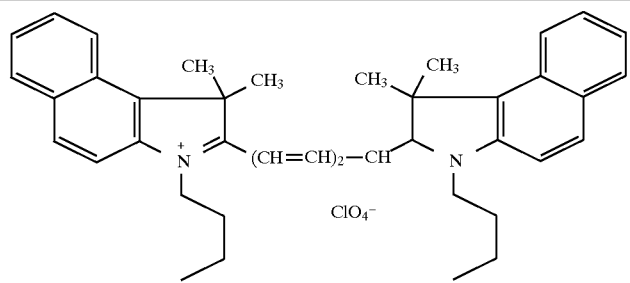
B-1
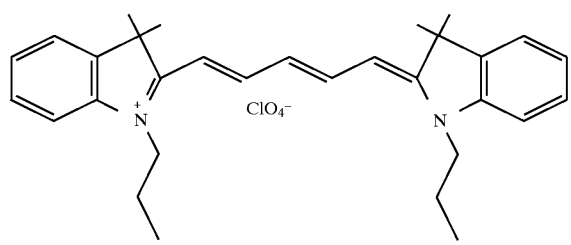
B-2
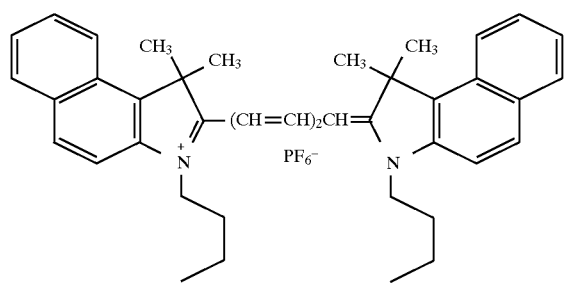
B-3
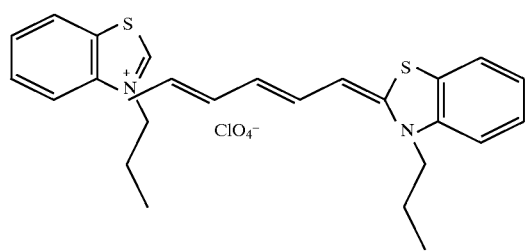
B-5
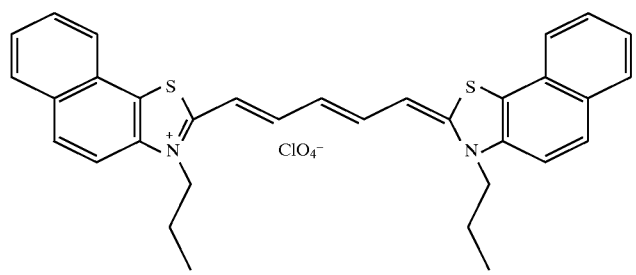
B-6
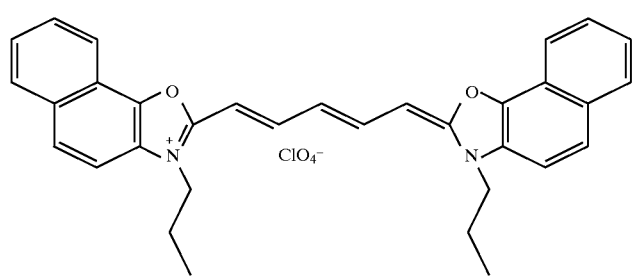
B-7

TABLE 1-continued

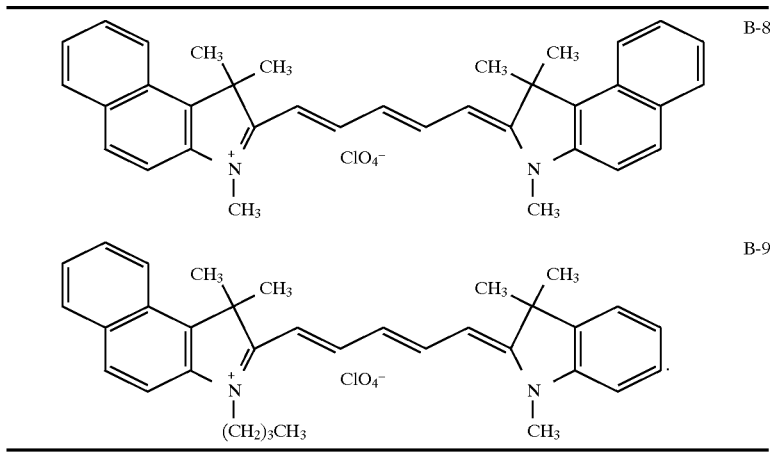

10. The optical recording element of claim 8 wherein the tetra dye has the structure (II):

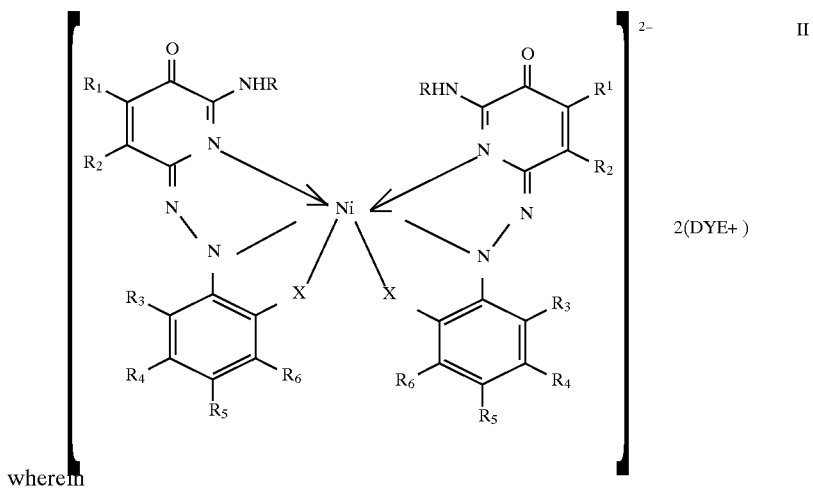

wherein

R represents hydrogen, alkyl having 1 to 20 carbons, aryl having 6 to 10 carbon atoms;

$R_1$ represents hydrogen or alkyl having 1 to 6 carbon atoms;

$R_2$ represents a hydrogen, alkyl having 1 to 5 carbon atoms, $SO_2R_7$ or $SO_2NHR_7$ where $R_7$ is alkyl having 1 to 10 carbon atoms, aryl having 6 to 10 carbon atoms, hetaryl having 5 to 10 carbon atoms or halogen;

$R_3$ represents hydrogen, alkyl having 1 to 4 carbon atoms or halogen;

$R_4$ represents hydrogen, halogen, alkyl having 1 to 10 carbons, $SO_2R_7$ or $SO_2NHR_7$;

$R_5$ represents an electron withdrawing group such as CN, $SO_2R_8$, $SO2NR_9R_{10}$ where $R_8$, $R_9$ or $R_{10}$ each independently represents hydrogen, alkyl group from 1 to 5 carbons; aryl having 6 to 10 carbon atoms; hetaryl, having 5 to 10 carbons, cycloalkyl having 5 to 7 carbons;

$R_6$ represents hydrogen; alkyl having 1 to 5 carbons or halogen;

X represents oxygen, carboxyl or sulfo; and

Dye+ represent a cationic dye chromophore.

11. The optical recording element of claim 10 wherein the metallized azo dianionic dye has a structure according to the following Table 2 and the cationic dye counterion has a structure selected from Table 3:

TABLE 2

Dianionic Dye Structure

| Dianion Ni Complex | R | R1 | R2 | R3 | R4 | R5 | R6 | X |
|---|---|---|---|---|---|---|---|---|
| A | H | H | H | H | Cl | $CH_3SO_2$ | H | O |

TABLE 2-continued
Dianionic Dye Structure
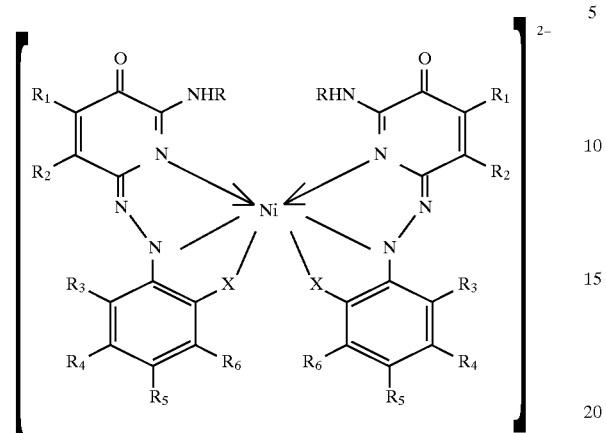
| Dianion Ni Complex | R | R1 | R2 | R3 | R4 | R5 | R6 | X |
|---|---|---|---|---|---|---|---|---|
| B | H | H | Br | H | H | $CH_3SO_2$ | H | O |
| C | H | H | $CH_3SO_2$ | H | Cl | $CH_3SO_2$ | H | O |
| D | H | H | $CH_3SO_2$ | H | Cl | $(CH_3)_3CNHSO_2$ | H | O |
| E | H | $CH_3$ | $CH_3SO_2$ | H | Cl | $CH_3SO_2$ | H | O |
| F | H | $CH_3$ | $CH_3SO_2$ | H | H | $NO_2$ | H | $SO_3$ |
| G | H | H | $CH_3SO_2$ | H | H | $CH_3SO_2$ | H | O |
| H | H | H | H | H | H | $CH_3SO_2$ | H | O |
TABLE 3
| No. | Cationic Structures |
|---|---|
| 1 | ![structure 1] |
| 2 | ![structure 2] |
| 3 | ![structure 3] |

TABLE 3-continued

| No. | Cationic Structures |
|---|---|
| 4 | |
| 5 | |
| 6 | |
| 9 | |
| 10 | |
| 11 | |
| 12 | |

TABLE 3-continued

| No. | Cationic Structures |
|---|---|
| 13 | (5-Cl, 3,3-dimethyl, N-butyl indolenine) pentamethine dimer |
| 14 | (5-Cl, 3,3-dimethyl, N-H indolenine) pentamethine dimer |
| 15 | (5-OCH₃, 3,3-dimethyl, N-H indolenine) pentamethine dimer |

12. The optical recording element of claim 11 wherein the tetra dye has a structure according to Table 4:

TABLE 4

Tetra Dyes

| Tetra Dye Number | [Dianionic Ni Azo Structures]² from Table 2 | [Cationic Structure]⁺ from Table 3 |
|---|---|---|
| A1 | C | 1 |
| A2 | H | 2 |
| A3 | C | 2 |
| A4 | D | 5 |
| A5 | C | 3 |
| A10 | C | 4 |
| A11 | C | 13 |
| A12 | C | 14 |
| A13 | D | 2 |
| A15 | E | 10 |
| A16 | E | 12 |
| A17 | F | 2 |

13. The optical recording element of claim 12 selected from table 5:

TABLE 5

| Mixture No. | Tetra Dye No. from Table 4 | First Added Dye No. from Table 1 | Second Added Dye No. from Table 1 |
|---|---|---|---|
| M-1 | A-4 | B-1 | |
| M-2 | A-3 | B-1 | |
| M-3 | A-3 | B-3 | |
| M-4 | A-2 | B-1 | |
| M-5 | A-13 | B-1 | |
| M-6 | A-17 | B-1 | |
| M-7a | A-13 | B-1 | B-2 |
| M-8 | A-13 | B-1 | B-9 |
| M-10 | A-3 | B-1 | B-9 |
| M-11 | A-13 | B-1 | A-3 |

* * * * *